No. 710,645. Patented Oct. 7, 1902.
C. H. WILLIAMS, Jr.
SIDE BEARING FOR RAILWAY CARS.
(Application filed May 26, 1902.)
(No Model.) 2 Sheets—Sheet 2.
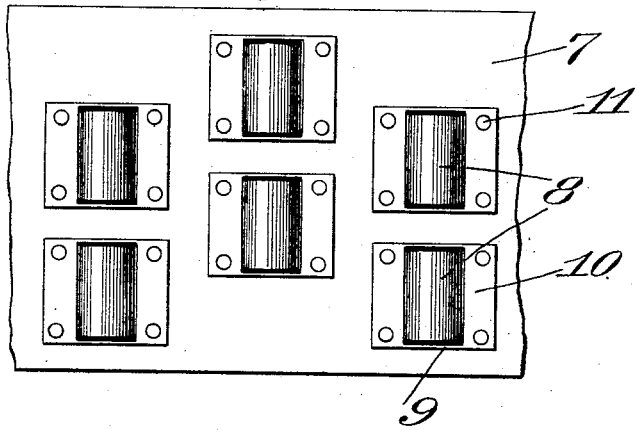
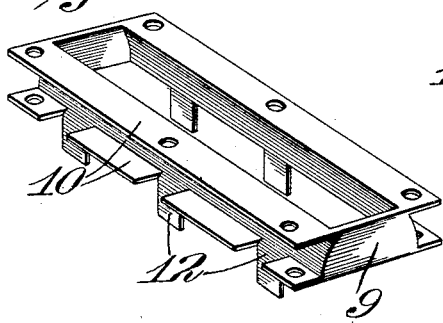
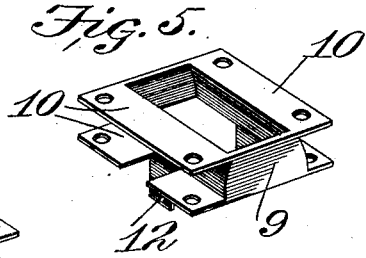
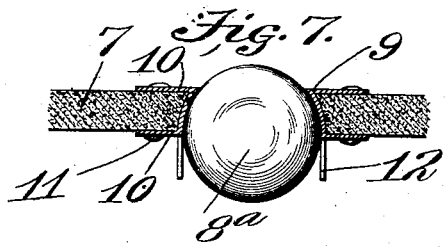
Witnesses:
G. A. Pennington
Ralph Talish
Inventor:
Chas. H. Williams, Jr.
By Bakewell & Cornwall
Attys.

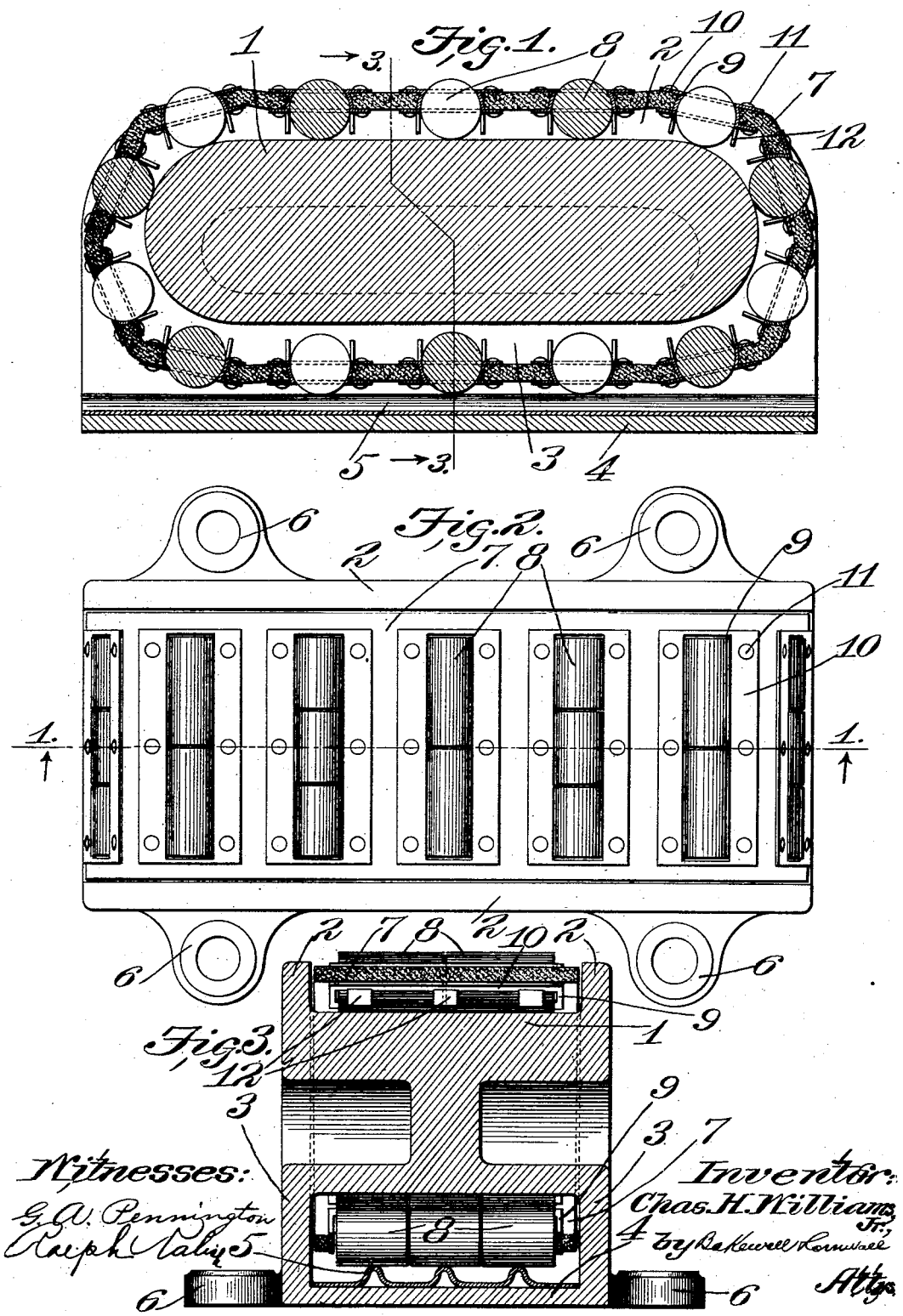

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

SIDE BEARING FOR RAILWAY-CARS.

SPECIFICATION forming part of Letters Patent No. 710,645, dated October 7, 1902.

Application filed May 26, 1902. Serial No. 108,971. (No model.)

*To all whom it may concern:*

Be it known that I, CHARLES H. WILLIAMS, Jr., a citizen of the United States, residing at Chicago, Cook county, Illinois, have invented a certain new and useful Improvement in Side Bearings for Railway-Cars, of which the following is a full, clear, and exact description, such as will enable others skilled in the art to which it appertains to make and use the same, reference being had to the accompanying drawings, forming part of this specification, in which—

Figure 1 is a sectional view of my improved side bearing on line 1 1, Fig. 2. Fig. 2 is a top plan view. Fig. 3 is a sectional view on line 3 3, Fig. 1. Fig. 4 is a fragmentary top plan view of a modified form of side bearing embodying my invention. Fig. 5 is a detail view of the bushing shown in Fig. 4. Fig. 6 is a detail view of the bushing shown in Fig. 2. Fig. 7 is a fragmentary view showing another modification of my invention.

This invention relates to a new and useful improvement in side bearings for railway-cars; and it consists in the construction and arrangement of parts hereinafter described and claimed.

I am aware that a series of antifriction-rollers connected at their ends to endless chains has been embodied in a side bearing.

Actual tests have demonstrated that unequal strain and tension are brought to bear upon side bearings, whereby the antifriction-rollers in side bearings of the character above indicated have a tendency to cant and bind against the guide walls or flanges at the sides of the track-plate—*e. g.*, when greater weight falls upon the outer ends of the rollers, which are usually tapered or conical, said outer ends being of larger diameter have a tendency to ride ahead, while the inner ends of the rollers lag.

To overcome the disadvantages above set forth, my invention comprehends an endless "belt" as distinguished from a "chain," said belt serving as a spacing medium and carrier for the antifriction devices, as well as preventing all undue canting or twisting of the same. Other features will be hereinafter more fully set forth.

In the drawings, 1 indicates the supporting-track for my improved bearing. This track consists of a casting having the guide flanges or walls 2 and supporting side walls 3. The supporting-walls 3 are connected at their lower ends by a base-plate 4, upon the upper face of which are secured tracks 5 of usual construction.

6 indicates securing ears or lugs. However, I do not wish to be limited to the exact form of casting shown.

7 indicates an endless belt, of leather or suitable flexible material, and 8 the antifriction-rollers. As shown in Fig. 2, these rollers are of different lengths and arranged in alternating series, the rollers of each series traveling in different paths, whereby a more even wearing of the track-plate is accomplished and grooving and burring prevented.

9 indicates metallic bushings whose interior openings are substantially tapered or conform to the contour of the outer faces of the rollers and in which said rollers have a free movement. These bushings are formed with flanges 10, having suitable openings for the passage of securing bolts or rivets 11.

12 indicates retaining projections for preventing the rollers from being displaced from under the bushings.

In Figs. 4 and 5 I have illustrated modified forms of my invention. In the former figure I have shown the rollers of uniform size and staggered with relation to each other and provided with individual bushings. In the latter figure I have shown an application of an antifriction ball-bearing 8$^a$. By the use of balls it is obvious that the lateral thrust incident to the service to which the bearing is put is compensated for. This thrust when placed upon rollers is sometimes objectionable, because the rollers are moved outwardly or inwardly, as the case may be, and jammed against the side wall of the casting, which action interferes with their free rotation. Where balls are used in the belt, an easy and free movement in all directions is provided for.

In the drawings I have illustrated the antifriction-rollers cylindrical in cross-section;

but I am aware that the same may be formed conical or tapered, and many other changes in the construction, combination, and arrangement of the several parts may be made and substituted for those herein shown and described without in the least departing from the nature and principle of my invention.

Having thus described my invention, what I claim, and desire to secure by Letters Patent, is—

1. The combination with a track-plate, of an encircling belt composed of flexible material, and antifriction devices loosely carried by said belt, substantially as described.

2. The combination with a track-plate, of an encircling belt composed of flexible material and being provided with spaces, and antifriction devices arranged in said spaces, substantially as described.

3. The combination with a track-plate, of an encircling belt composed of flexible material and being provided with spaces, and antifriction devices riding on said plate and protruding through said spaces, substantially as described.

4. The combination with a track-plate, of an encircling belt having tapering openings, bushings in said openings, and antifriction devices in said bushings, substantially as described.

5. The combination with a track-plate, of a belt encircling the same, bushings in said belt, and antifriction devices riding on said track-plate and protruding through said bushings, substantially as described.

6. The combination with a track-plate, of an encircling belt, tapering bushings in said belt, and antifriction-rollers in said bushings, substantially as described.

7. The combination with a track-plate, of an encircling belt, bushings in said belt, and antifriction-rollers of different lengths in said bushings, substantially as described.

8. The combination with a track-plate, of an encircling belt, bushings in said belt, and antifriction-rollers of different lengths in said bushings, said rollers being arranged in alternating series, substantially as described.

9. The combination with a track-plate, of an encircling belt, bushings in said belt, the openings in said bushings being contracted at their outer ends, and antifriction-rollers in said bushings and projecting through said contracted openings, said rollers being staggered with relation to each other, substantially as described.

10. The combination with a track-plate, of an encircling belt, bushings in said belt, antifriction devices in said bushings, and means for preventing the displacement of said antifriction devices in said bushings, substantially as described.

11. The combination with a track-plate, of an encircling belt, bushings in said belt, antifriction-rollers in said bushings, and projections on said bushings for preventing the displacement of said rollers therefrom, substantially as described.

12. The combination with a track-plate, of an encircling belt, bushings in said belt, antifriction-rollers in said bushings, said rollers being staggered with relation to each other, and projections on said bushings for preventing the displacement of said rollers, substantially as described.

13. The combination with a track-plate, of an encircling belt, bushings in said belt, antifriction-rollers in said bushings, said rollers being of different lengths and arranged in alternating series, and projections on said bushings for preventing the displacement of said rollers, substantially as described.

In testimony whereof I hereunto affix my signature, in the presence of two witnesses, this 17th day of May, 1902.

CHARLES H. WILLIAMS, JR.

Witnesses:
JOHN A. CARROLL,
CHARLES BENDFELT.